United States Patent
Tabler

[15] 3,676,513
[45] July 11, 1972

[54] HYDROCARBON DEHYDROGENATION EMPLOYING METAL ANTIMONIDE CATALYSTS

[72] Inventor: Donald C. Tabler, Bartlesville, Okla.
[73] Assignee: Phillips Petroleum Company
[22] Filed: Jan. 8, 1971
[21] Appl. No.: 105,110

[52] U.S. Cl. .................. 260/668 D, 260/666 A, 260/680 R
[51] Int. Cl. .................................................. C07c 5/18
[58] Field of Search ............ 260/666 A, 668 D, 680 R, 683.3; 252/464, 465

[56] References Cited

UNITED STATES PATENTS 3,291,755  12/1966  Haensel et al. ..................... 252/464

*Primary Examiner*—Curtis R. Davis
*Attorney*—Young & Quigg

[57] ABSTRACT

Antimonides of cobalt and nickel are employed for dehydrogenating naphthenes and olefins.

9 Claims, No Drawings

HYDROCARBON DEHYDROGENATION EMPLOYING METAL ANTIMONIDE CATALYSTS

This invention pertains to dehydrogenating hydrocarbons.

In one of its more specific aspects, this invention pertains to dehydrogenation of naphthenes and olefins employing antimonides of cobalt and nickel.

The method of this invention is employed to convert the organic compounds concerned to more valuable materials as, for example, for the dehydrogenation of cyclohexane to cyclohexene and benzene.

According to the method of this invention there is provided a process for the dehydrogenation of naphthenes and olefins contained in a feedstream which comprises contacting said feedstream with a catalyst having the general formula of $MY_x$ in which M is a metal selected from the group consisting of nickel and cobalt, Y is antimony, and $x$ has a value from about 0.33 to about 2.0, preferably from about 0.6 to about 1.0.

The term dehydrogenation as used herein will mean any reduction in the number of hydrogen atoms on a hydrocarbon molecule including aromatization as well as the formation of monoolefins and polyenes.

The naphthenes to which the process is applicable include alkylnaphthenes and alkenylnaphthenes, including compounds such as cyclopentane, cyclohexane, cycloheptane, cyclooctane, methylcyclopentane, methylcyclohexane, 1,3-dimethylcycloheptane, vinylcyclohexane, 1-butyl-4-(2-butenyl)cyclooctane, 1,3-dibutyl-4-ethylcyclohexane, 1,2,4,5-tetraethylcycloheptane, and the like, and mixtures thereof. In general, the naphthenes will contain from five to 16 carbon atoms with five to eight carbon atoms in the ring and one to four carbon atoms in the substituent alkyl or alkenyl group, if present.

The olefins to which the process is applicable include cycloolefins, acyclic olefins and alkyl- and alkenyl-substituted cyclic olefins including cyclopentene, ethylcyclopentene, 1,4-dipropylcycloheptene, 1,2,4-triethylcyclooctene, 4-vinylcyclohexene, 2-vinyl-4-butylcycloheptene, 2,3-dimethyl-4-butyl-6-ethylcyclooctene, 3-hexadecene, 2-butene, 2-methyl-3-hexene, and the like, and mixtures thereof. In general, the olefins will contain four to 16 carbon atoms if acyclic and from five to 16 if cyclic with five to eight carbon atoms in the ring.

While a supported catalyst is preferred, the catalyst can be employed in a nonsupported state as, for example, in the form in which the principal components are coprecipitated from a sol.

In the supported stated, any conventionally employed nonacidic or relatively nonacidic catalyst support can be used. Preferred supports include gamma-alumina, alpha-alumina, silica, titania, charcoal, calcium aluminate, natural or synthetic molecular sieves and their combinations. Generally, the grannular support will have a surface area of about 1 to about 400 square meters per gram.

The supported catalysts of this invention are prepared by conventional techniques. The nickel or cobalt and antimony, can be simultaneously deposited on the support as, for example, by precipitating nickel antimonide on the support. Alternately, the support can be impregnated with the nickel or cobalt followed by impregnation with antimony. Regardless of the method, the final catalyst will contain from about 5 to about 40, preferably 10 to 20, weight percent nickel or cobalt and from 6 to 60, preferably 15 to 40, weight percent antimony.

After deposition on the support of the materials concerned, the support can be washed to remove undesirable soluble salts, dried, calcined in air and then reduced with hydrogen at any temperature and pressure which produces the active catalyst. For example, hydrogen reduction at atmospheric pressure at 500° to 800° F. for 0.1 to 20 hours can be used. In some instances, it will be satisfactory to omit the calcination step.

The method of this invention is carried out by contacting the feedstream with the catalyst and with hydrogen at a temperature of from about 800° F. to about 1,300° F., preferably 1,000° to 1,200° F., at a pressure of from about atmospheric to about 1,000 psig. The feedstream charge rate will be about 0.5 to about 5 LHSV and the hydrogen charge rate will be from about 0.2 to about 5 mole of hydrogen per mole of total hydrocarbon feed.

The invention can be used to produce aromatics from substituted and unsubstituted naphthenes. It can be used to convert cyclic and acyclic olefins to dienes, polyenes, and aromatics. It can also convert naphthenes such as cyclohexane and methylcyclopentane to significant amounts of cyclohexene and methylcyclopentenes, particularly when low pressures, less than about 100 psig, and low conversions are employed.

The following examples set forth methods of preparing the catalyst and of carrying out the process. These examples are not to be considered as limiting the invention to the specifics involved.

EXAMPLE I

One hundred and four grams of nickel nitrate, $Ni(NO_3)_2 \cdot 6H_2O$, were dissolved in 400 ml. of water. Crushed ice was used to bring the total volume to 600 ml. Thirty-one milliliters (71 g) of antimony pentachloride were then slowly added with agitation. The resulting solution was then neutralized to a pH of about 7 with a potassium hydroxide solution comprised of about 109 g of KOH in about 200 ml. of water.

The solution was filtered to recover the precipitate which had formed. The precipitate was washed and blended with 30 g of a particulate flame-hydrolyzed alpha-alumina to form a paste which was then dried at 110° C.

The dried solids were ground and screened and the 10 to 40 mesh portion was recovered. This material was reduced in a stream of hydrogen at 1 atmosphere and 800° F. for 2 hours after which it was cooled in a stream of hydrogen.

The catalyst was found to contain 16 weight percent nickel and 35 weight percent antimony.

EXAMPLE II 14.5 g of nickel nitrate, $Ni(NO_3)_2 \cdot 6H_2O$, were dissolved in 150 ml. of water, the resulting solution being cooled in an ice bath. 11.8 g (5 ml.) of antimony pentachloride ($SbCl_5$) were then slowly added with agitation.

To the resulting solution were added 45 grams of a finely divided flame-hydrolyzed alpha-alumina to form a paste which was then neutralized to a pH of about 6 to 7 by the addition of 25 ml. of 28 percent ammonium hydroxide solution. The paste was dried for about 16 hours at 100° C.

The dried cake was ground and the 10 to 40 mesh material was recovered and heated in a stream of air at 1,000° F. for 2 hours. This catalyst contained 5.34 weight percent nickel and 7.1 weight percent antimony. It was allowed to cool for about 16 hours after which it was reduced in a stream of hydrogen at 1 atmosphere pressure for 2 hours at 800° F.

When the catalyst comprised cobalt, it was prepared in a manner similar to those detailed above, the cobalt being derived from cobalt acetate, $Co(C_2H_3O_2)_2 \cdot 4H_2O$.

The following examples demonstrate the method of this invention in relation to a variety of feedstocks using the above-prepared and other similar alumina-supported catalysts.

TABLE I

| Run No. | 1 | 2 | 3 | 4 | 5 |
| --- | --- | --- | --- | --- | --- |
| Catalyst Composition, Wt. % | | | | | |
| Cobalt | 7.6 | 7.6 | | | 9.0 |
| Nickel | | | 16.0 | 5.0 | |
| Antimony | 13.0 | 13.0 | 35.0 | 7.0 | 8.0 |
| Support | 79.4 | 79.4 | 49.0 | 88.0 | 83.0 |
| Feedstock | cyclohexane | cyclohexane | cyclohexane | methylcyclopentane | methylcyclopentane |
| Reaction Conditions | | | | | |

| | | | | |
|---|---|---|---|---|
| Temp., °F. 1148 | 1077 | 1130 | 998 | 960 |
| Pressure, psig 100 | 600 | 400 | 200 | 400 |
| Liquid Hydrocarbon Feed Rate, LHSV 1 | 1 | 1 | 1 | 1 |
| Hydrogen to Total Hydrocarbon Mole Ratio 2 | 2 | 2 | 2 | 2 |
| Product analysis, Wt.% | | | | |
| Lighter than Feed | | | 7.3 | 15.44 |
| Methylcyclopentane 2.88 | 19.11 | 9.98 | 57.35 | 61.82 |
| Cyclohexane 31.91 | 41.73 | 26.03 | 1.57 | – |
| Methylcyclopentene 0.64 | – | 2.02 | 1.14 | 1.03 |
| Cyclohexene 1.19 | – | 1.77 | – | – |
| $C_5$ and $C_6$ Olefins 1.10 | 1.21 | 1.68 | 0.35 | 0.48 |
| Benzene 41.58 | 14.88 | 37.64 | 1.21 | 0.72 |
| Toluene 8.21 | 8.15 | 10.93 | 5.34 | 2.94 |
| $C_8$ Aromatics 8.17 | 6.60 | 6.33 | 13.92 | 7.82 |
| $C_9 + C_{10}$ Aromatics 4.30 | 7.90 | 3.62 | 10.81 | 9.73 |

The above data demonstrate the operability of the method of this invention for producing aromatics from naphthenic feeds.

The following runs demonstrate the operability of the method of this invention when applied to the dehydrogenation of naphthenes and specifically to the dehydrogenation of cyclohexane to produce cyclohexene.

TABLE II

| Run No. | 7 | 8 | 9 | 10 | 11 |
|---|---|---|---|---|---|
| Catalyst Composition, Wt. % | | | | | |
| Cobalt | | | | | 7.6 |
| Nickel | 16 | 5 | 16 | 16 | |
| Antimony | 35 | 7 | 35 | 35 | 13.0 |
| Support | 49 | 88 | 49 | 49 | 79.4 |
| Reaction Conditions | | | | | |
| Temp., °F. | 1059 | 1000 | 1110 | 1178 | 1148 |
| Pressure, psig | 100 | 200 | 100 | 0 | 100 |
| Liquid Hydrocarbon Feed Rate, LHSV | 1.5 | 1.1 | 1.1 | 1.0 | 1.1 |
| Hydrogen to total Hydrocarbon, Mole Ratio | 1.5 | 2.0 | 2.2 | 2.5 | 1.9 |
| CO in Hydrogen, mole % | 0 | 0 | 0 | 1.1 | 0 |
| Product Analysis, Wt. % | | | | | |
| Methylcyclopentane | Trace | 3.71 | 6.75 | 0 | 2.88 |
| Cyclohexane | 97.89 | 87.96 | 79.76 | 91.61 | 31.91 |
| 1-Methylcyclopentene | 0.0 | 0.45 | 0.60 | 0.0 | 0.64 |
| Cyclohexene | 1.07 | 0.80 | 3.52 | 2.81 | 1.19 |
| Benzene | 1.04 | 2.68 | 7.39 | 5.21 | 41.58 |
| Heavier | 0.0 | 4.43 | – | – | – |
| $C_5 + C_6$ Olefins & Paraffins | | | 0.48 | 0.33 | 1.10 |
| Toluene | | | 0.60 | 0.05 | 8.21 |
| Xylenes | | | 0.37 | 0 | 6.16 |
| $C_9$ Aromatics | | | 0 | 0 | 6.31 |

It will be noted in Run 10, carbon monoxide was introduced into the reaction. In general, it has been found that the introduction of carbon monoxide has little effect upon the reaction.

The method of this invention can also be conducted employing a mixture of the catalysts disclosed to process a mixture of hydrocarbons.

It will be evident from the foregoing that various modifications can be made to the method of this invention. Such, however, are considered as being within the scope of the invention.

What is claimed is:

1. A process for dehydrogenating naphthenes and olefins comprising a feedstream which comprises contacting said feedstream with hydrogen and with a supported catalyst having the formula $MY_x$ in which M is a metal selected from the group consisting of nickel and cobalt, Y is antimony, and $x$ has a value within the range of from about 0.33 to about 2.0.

2. The method of claim 1 in which said catalyst is supported on a support selected from the group consisting of gamma-alumina, alpha-alumina, silica, titania, charcoal, calcium aluminate and molecular sieves.

3. The method of claim 1 in which said metal is present in said catalyst in an amount from about 5 to about 40 weight percent.

4. The method of claim 1 in which said contacting is made at a temperature within the range of from about 800° F. to about 1,300° F. at a pressure of from about atmospheric to about 1,000 psig.

5. The method of claim 1 in which said naphthenes contain five to 16 carbon atoms, five to eight of said carbon atoms being contained in the ring structure of said naphthene and zero to four carbon atoms being contained in substituent groups of said naphthene.

6. The method of claim 1 in which cyclohexane is contacted with hydrogen and with a supported cobalt antimonide catalyst at a temperature of about 1,150° F. and a hydrocarbon feed rate of about 2 LHSV.

7. The method of claim 1 in which cyclohexane is contacted with hydrogen and with a supported nickel antimonide catalyst at a temperature of about 1,130° F. and a hydrocarbon feed rate of about 2 LHSV.

8. The method of claim 1 in which methylcyclopentane is contacted with hydrogen and with a supported nickel antimonide catalyst at a temperature of about 1,000° F. and a hydrocarbon feed rate of about 2 LHSV.

9. The method of claim 1 in which methylcyclopentane is contacted with hydrogen and with a supported cobalt antimonide catalyst at a temperature of about 960° F. and a hydrocarbon feed rate of about 2 LHSV.

* * * * *